United States Patent [19]

Tengler

[11] 4,235,471
[45] Nov. 25, 1980

[54] ANGULAR VIBRATION ISOLATOR FOR SEAT BACK

[75] Inventor: Harvey N. Tengler, New Berlin, Wis.

[73] Assignee: UOP Inc., Des Plaines, Ill.

[21] Appl. No.: 972,112

[22] Filed: Dec. 21, 1978

[51] Int. Cl.² .......................... A47C 1/024; A47C 3/00
[52] U.S. Cl. .................................... 297/361; 248/596; 248/632; 297/306
[58] Field of Search ............... 297/285, 300, 304, 306, 297/354, 355, 361; 248/592, 594, 596, 615, 618, 632

[56] References Cited

U.S. PATENT DOCUMENTS

| | | | |
|---|---|---|---|
| 1,663,898 | 3/1928 | Bitzenburger | 297/304 |
| 1,926,763 | 9/1933 | Cliffe | 248/362 |
| 2,926,725 | 3/1960 | Eckmann | 297/306 |
| 3,770,235 | 11/1973 | Klapproth et al. | 248/632 X |
| 4,008,920 | 2/1977 | Arndt | 297/361 |
| 4,084,850 | 4/1978 | Ambasz | 297/306 X |

FOREIGN PATENT DOCUMENTS

| | | | |
|---|---|---|---|
| 497657 | 12/1950 | Belgium | 297/306 |
| 483083 | 7/1953 | Italy | 297/306 |
| 233519 | 5/1925 | United Kingdom | 297/306 |
| 1165135 | 9/1969 | United Kingdom | 297/285 |

Primary Examiner—William E. Lyddane
Attorney, Agent, or Firm—James R. Hoatson, Jr.; Barry L. Clark; William H. Page, II

[57] ABSTRACT

Angular vibration isolation is provided for a seat back member in combination with a mechanism for adjusting the seat back angle. Eccentrically mounted cylindrically shaped cam members located at each side of the seat back frame can be adjustably rotated within a guide channel carried by the seat back frame. The cams are positioned at a distance from a pivot axis on the seat frame around which the seat back can tilt in order to adjust the angle of tilt. One of the parallel, opposed flanges which define each of the guide channels is spaced from its respective cam member by a resilient means such as a thick pad of elastomeric material which fills the space between the cam member and said one flange. The elastomeric pads are compressed as the seat back is forced forwardly against the seat occupant's back due to vehicle vibration, thus permitting the seat back to be driven rearwardly while the occupant's position in space remains relatively fixed.

9 Claims, 3 Drawing Figures

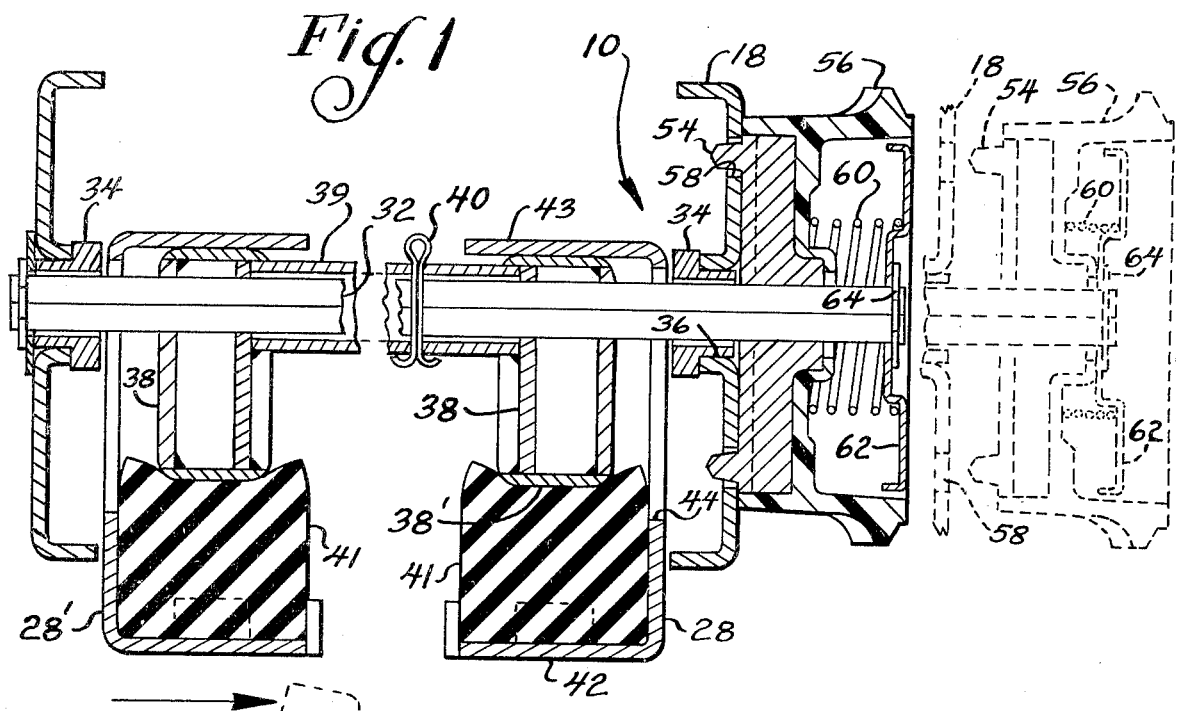
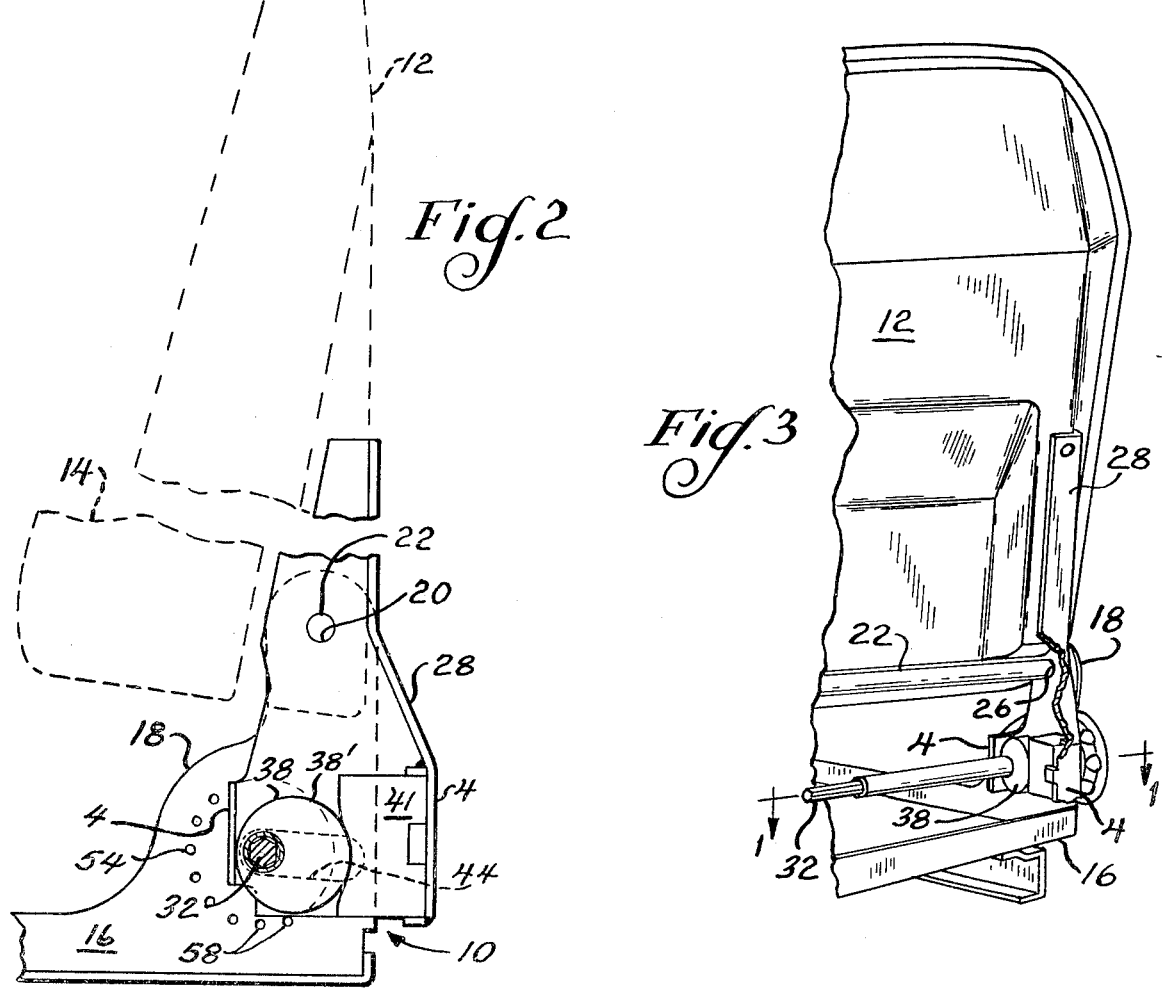

ANGULAR VIBRATION ISOLATOR FOR SEAT BACK

BACKGROUND OF THE INVENTION

The invention relates to vehicle seats and particularly to the field of vibration isolation. In road vehicles, such as trucks, as well as off-the-road vehicles, such as tractors and scrapers, it is quite conventional to isolate vertical vibrations by mounting the seat on a resilient suspension. It is also common to provide fore and aft isolation by mounting the seat bottom on tracks which can slide fore and aft with the occupant against springs. Such fore and aft isolation systems can usually be locked out when desired since under severe vibration conditions they can hit their end stops and cause the operator's feet to move rapidly relative to the pedals in the vehicle and thus reduce, rather than increase, his ability to control the vehicle. Shock absorbers or other damping devices can reduce the aforementioned problem but they also reduce the ability to isolate vibrations. Also, when the vehicle is on either an up or down slope, the weight of the operator and seat can cause the seat to slide to one end of its isolation travel path.

The above-noted deficiencies of commercially available fore and aft isolator mechanisms would seem to suggest that a system which would permit good pedal contact at all times while minimizing violent back and forth movement of the operator's torso and heart would be highly desirable.

SUMMARY

It is among the objects of the present invention to provide a vibration isolation mechanism for a vehicle seat which will provide a substantial portion of the operator comfort advantages of available fore and aft isolation mechanisms as well as additional operator vibration isolation, at least in the critical heart region, during the periods of excess vibration when conventional mechanisms are ordinarily locked out of operation. Another object is to provide a considerable amount of fore and aft isolation in situations where there is insufficient space in the vehicle to mount a seat with a conventional fore and aft isolation unit. It is a further object to provide a back cushion angular vibration isolator which is of simple construction and easy to install. A still further object is to provide a back cushion angular vibration isolator which forms a portion of a back angle adjustment mechanism so that isolation is provided at any angle of back adjustment.

These and other objects and advantages are attained by the seat back angle adjustment and isolation mechanism of the present invention. The seat back angle is adjusted by eccentric cams which are mounted in pairs of channels carried by the seat back frame in a fashion quite similar to that disclosed in U.S. Pat. No. 4,008,920 to O. H. Arndt, assigned to a common assignee, the disclosure of which is incorporated by reference herein. In the aforementioned patent, the seat back angle is adjusted by angularly rotating a circular cam plate which is eccentrically mounted for rotation about an axis which is spaced from and fixed relative to a pivot axis for the seat back. The cam plate is captured between a pair of guide rails in the form of a channel formed as part of the seat back frame. Since opposed peripheral edges of the circular cams engage, or at least substantially engage, both guide rails at once, rotation of the cams about their eccentric axes will cause the seat back to tilt about its pivot axis through a predetermined range of adjustment. In the present invention, an axially elongated, cylindrically surfaced cam is mounted at each side of the seat back frame for rotation about a support rod having an eccentrically positioned axis which is mounted for rotation in the seat frame. The cylindrical cams are positioned between the parallel, opposed flanges or side rails of a pair of generally vertical channel portions formed on or attached to the seat back frame. However, the diameter of the cams is substantially smaller than the distance between the flanges so as to form a space between the cam and one flange when the cam is contacting the other flange. The space is filled with a resilient means such as an elastomer pad or metal spring which is affixed to the one flange. The elastomer pads preferably are made of a durable material such as Buna N rubber having a durometer of about 35 or 70 Shore A that can withstand the environment to which the seat is subjected. They also preferably have a spring rate which is sufficient to provide substantial seat back deflection when subjected to loading by seat occupants of varying weights. The loading situation can be typically described as one wherein vehicle fore and aft or rotational pitching vibrations force the seat back forwardly against the occupant's back or rearwardly away from it. The major force of the forward impact of the seat back against the occupant is absorbed by the elastomer pads so as to cause the seat back to tilt rearwardly from its normal position, thus leaving the occupant at a relatively fixed position in space. As the vibration force switches direction to tend to drive the seat back rearwardly, the energy absorbed in the deflected elastomeric pads will cause the seat back to be driven forwardly while remaining in contact with the occupant's back. The net result is that the occupant will experience very little fore and aft pitching movement, thus greatly increasing his comfort since it is known that the comfort of the seat occupant is related to the magnitude of acceleration. The greater the acceleration, the less time one can endure it and perform effectively.

A conventional fore and aft isolator provides for about 2" of total travel or about 1" forward or backward movement from its centered position. Typically, such an isolator includes springs which are displaced 1" by a 30 pound load. Since the isolator is usually under the seat, it sees not only the entire weight of the occupant but also the entire weight of the seat. Accordingly, it is quite sensitive to variations in operator weight and to changes in the angle of the road surface relative to horizontal. In the seat back isolator of the present invention, the vast bulk of the seat weight and most of the weight of the operator do not exert a horizontal force component on the seat back. Thus, better control can be provided for occupants of differing weights.

It is preferable for operator comfort that the angle of the seat back be maintained at about the same angle during use regardless of the weight of the particular occupant. If the resilient members associated with the back angle isolator have a constant spring rate, it is obvious that the back angle, if not separately adjusted, would probably be too close to the vertical for a light weight occupant and too tilted to the rear for a heavier occupant. The present invention discloses a back angle adjuster which permits the back angle to be adjusted by the occupant while the occupant is comfortably seated. If a seat manufacturer did not wish to provide for back angle adjustment, the resilient members could be adjustably preloaded to assume a desired angle when occupied by occupants of differing weights or they could be especially shaped to provide a non-linear spring rate which would cause them to become stiffer and stiffer as they were deflected. In the latter case, the light occupant could enjoy the comforts of a much larger range of deflection than would be the case if a spring having a constant rate spring were used which would only fully deflect from the loading exerted by a heavy occupant. Even when a back angle adjustment feature is provided, as disclosed herein, it is usually desirable to provide a certain amount of preload or compression of the resilient members when the seat is unoccupied. This preloading has several advantages, including a reduction in the overall amount of travel which must be provided for the top of the seat back. Space is usually at a premium in a truck cab. To conserve it, rather than have the top of the seat back move 4.5", for example, I prefer to preload the resilient means so that a 3" movement of the top of the seat back will absorb the same energy as a 4.5" movement of an unpreloaded back. Another advantage of preloading is that some occupants will not cause the seat back to resiliently deflect by the normal horizontal force component exerted by their back on the seat when they are seated comfortably. Thus, the seat back angle will not always need to be adjusted after an occupant sits down. Still another advantage of preloading is that the seat back will have no tendency to rattle when unoccupied.

BRIEF DESCRIPTION OF THE DRAWINGS

FIG. 1 is a bottom sectional view of the tilting, locking and vibration isolation mechanism taken on line 1—1 of FIG. 3;

FIG. 2 is a fragmentary side view of a seat incorporating the invention; and

FIG. 3 is a fragmentary rear perspective view showing a seat back incorporating the invention.

DETAILED DESCRIPTION

FIG. 1 shows a detailed cross-section of my improved seat adjusting and vibration isolating mechanism 10 while FIG. 2 shows the relationship of the seat adjuster and isolator 10 to a seat consisting of a seat back 12, a seat cushion 14 and a seat frame 16. The seat frame 16 includes a pair of upwardly extending seat back mounting portions 18 which include a first aperture 20 in which a pivot rod 22 is mounted and retained by means such as E-rings (not shown). The pivot rod 22 also passes through a first aperture 26 (FIG. 3) in each of a pair of angle members 28, 28' which are rigidly attached to the seat back 12. Referring to FIG. 2, one can appreciate that the seat back member 12 can be moved back to various angles of tilt relative to the seat cushion 14 by pivoting it about the pivot rod 22. The amount of fixed pivotal movement which can take place, as distinguished from resilient isolation movement, is controlled by adjuster and isolator mechanism 10 which, as seen in FIG. 1, includes a hexagonal rod member 32 mounted in bearings 34 in second apertures 36 formed in the seat back mounting portions 18 of the frame 16. A pair of cylindrical cam members 38 are welded eccentrically of their axes to a spacer tube 39 which is fastened to the hexagonal rod 32 by a pin 40 so that two diametrically opposed portions of the members will be spaced from the rod 32 by different amounts to provide eccentric peripheral cam surfaces 38'. First portions of the outer peripheral cam surfaces 38' of the cam members 38 engage elastomeric pads 41 which are supported by the rear wall portions 42 while second diametrically opposed portions simultaneously engage the front wall portions 43. The parallel, opposed wall portions 42, 43 form a channel or guide track in the angle members 28, 28' which are rigidly attached to the seat back 12. An elongated slot 44 (FIG. 2) formed in the pivotable angle member 28 permits the seat back 12 to tilt forwardly and backwardly about the pivot rod 22 without interferring with the hexagonal rod 32. A rotation of the cam member 38 over an approximately 180° range from the FIG. 2 position will cause the seat back 12 to progressively pivot about pivot rod 22 from its forwardmost to its rearwardmost fixed position of adjustment. The seat back is positively retained in any one of about 10 positions of adjustment throughout this range by means of a pair of locking pins 54 which are carried by knob 56 and are adapted to engage in any pair of diametrically opposed apertures 58 in a circle of such apertures formed in the rear upwardly extending portion 18 of the frame 16.

In operation, the knob 56 is pulled axially outwardly by the seat occupant against the force of spring 60 as shown in dotted lines in FIG. 1. Once the locking pins 54 are clear of the frame portion 18 the knob 56 can be very easily rotated over a 180° range to cause a simultaneous rotation of the cam members 38 and a consequent pivoting of the angles 28, 28' and tilting of the seat back 12. When a desired adjustment position has been reached, the operator merely releases the knob 56 and the spring 60 will cause the pins 54 to engage in one of the opposed pairs of holes 58. The spring 60 is retained between the interior portion of the knob 56 and a cover plate 62 while the cover plate 62 is retained on the hexagonal rod 32 by means of an E-ring 64.

The elastomeric pads 41 are shown as being slightly compressed and are thus preloaded so that a predetermined amount of force must be applied by a seat occupant in the direction of the arrow in FIG. 2 before the seat back 12 will start to move rearwardly. Thus, all occupants of less than a certain weight would normally not deflect the seat. As previously discussed, this situation reduces the amount of seat back movement that must be accommodated, reduces the need to vary the fixed seat back angle for different occupants, and prevents rattling when the seat is not occupied. The thickness of the pad 41 and the distance it can be depressed are selected in accordance with the distance which the seat back can be permitted to move and the respective distances between the top of the seat back and the pivot shaft 22 and between the pivot shaft 22 and the portion of the cam periphery 38' which engages the pad 41. For example, if the top of the seat back 12 can move 3" and it is located 18" from the pivot shaft 22, the pad 41 would be compressed 0.5" if its contact point with the cam surface 38' were 3" from the pivot shaft 22. Preferably, a stop member (not shown) is provided to limit the compression of the pad 41. The durometer of the pad 41, its size, the area of contact of the contact surface 38' of the cam 38 with the pad 41, the degree of peloading, and the distances of the pad from the pivot shaft 22 are all selected so that a predetermined amount of seat loading in the direction of the arrow can be accommodated in the deflection range which is available. Obviously, when there is a large distance over which loading can be absorbed, the pad 41 can be selected to have a lower spring rate than when space is more restricted. The lower spring rate would be more comfortable to the lighter occupant since he could deflect such a spring over a greater distance than he could deflect a stiffer spring.

An example of one satisfactory construction which provides good isolation utilized pads 41 of Buna N rubber having a durometer of 40 Shore A which are 1.2" thick, 1.2" wide and 1.9" high. The cams 38 have a 1.5" outer diameter and a width of 0.75" in contact with the pads 41. The pads are compressed or preloaded by 34 pounds each, causing a 0.22" deflection. The maximum compression of the pads before a limit stop (not shown) is contacted is 134 pounds each, providing a total deflection of 0.5", or 100 pounds and 0.28" beyond the preload compression. If one considers the loading of the seat back 12 by the occupant to be at a distance of 12" from the pivot axis 22 and if the pads 41 are compressed at a point 3" from the pivot axis, the lengths of the upper and lower lever arms relative to the axis 22 bear a relationship of 4:1. Thus, if each pad 41 is fully compressed by a load of 134 pounds, the pair of pads will absorb 268 pounds which can be applied by applying a load of 67 pounds at a point 12" above the axis 22. The pads can thus absorb 1.86 g of acceleration for a large or 95th percentile man weighing 221 pounds who would normally exert a 36 pound static force on the seat back. An average or 50th percentile man weighing 166 pounds and exerting a 27 pound static force could have 2.5 g of acceleration absorbed and a light or 5th percentile man weighing 105 pounds could have 3.9 g of acceleration absorbed. The preceding figures are based on the assumption that about 76% of a person's weight is carried by the seat and 24% by the floor and that about 22% of a person's weight which is applied to the seat is applied to the seat back when he is seated comfortably. In the present example, the light, or 5th percentile man, who weighs 105 pounds will not cause the seat back to deflect when he sits down since the 17 pounds he applies to the seat back at a point 12" above rod 22 will exactly equal the 34 pound preload applied to each of the pads 41 at a point 3" below the rod 22. Thus, lighter occupants will not have to adjust the seat back angle from its normal position.

I claim as my invention:

1. A combination seat back angle adjustor and angular motion vibration isolator for a vehicle seat comprising a seat frame; a seat bottom cushion carried by said seat frame; a seat back frame; a seat back cushion carried by said seat back frame; pivot means on said seat frame and seat back frame for pivotally mounting said seat back frame for angular tilting movement relative to said seat frame; angular adjustment means mounted on said seat frame and said seat back frame at a location spaced from said pivot means to selectively adjust the normal angular position of said seat back frame relative to said seat frame over a predetermined adjustment range; said angular adjustment means including a pair of rigid, cooperating contacting elements at each side of said seat back frame which prevent forward movement of the seat back frame in any position of adjustment; said angular adjustment means further including resilient means comprising a spring member which is slightly compressed or preloaded when the seat is not occupied and which normally biases said pair of rigid cooperating contacting elements into contact with each other, one of said contacting elements being integral with said seat back and the other being integral with said seat frame, said contacting elements being separable with one of them compressing the spring member for permitting a limited amount of angular rotation of said seat back in a rearward direction when said seat back is driven against the back of an occupant of the seat by fore and aft or pitching type vehicular vibrations which exert a force greater than the preloading.

2. The combination seat back angle adjustor and angular motion vibration isolator of claim 1 wherein said pivot means on said seat back is positioned at a location below the location where the seat back is adapted to be engaged by an occupant and the spring member is positioned at a location below said pivot means.

3. The combination seat back angle adjustor and angular motion vibration isolator of claim 1 wherein said one contacting element comprises the forward wall portion of a channel-shaped member having a pair of opposed, parallel wall portions, the spring member being mounted between the rearward wall portion and the other of said contacting elements.

4. The combination seat back angle adjustor and angular motion vibration isolator of claim 3 wherein said other of said contacting elements is a cylindrically shaped member which is eccentrically mounted on an axis which is rotationally adjustable to selectively adjust the normal angular position of said seat back frame relative to said seat frame over said predetermined adjustment range.

5. The combination seat back angle adjustor and angular motion vibration isolator of claim 4 wherein said spring member is an elastomer pad which is slightly compressed or preloaded when said seat is not occupied.

6. The combination seat back angle adjustor and angular motion vibration isolator of claim 5 wherein said elastomer pad is sufficiently preloaded that the normal static loads exerted into the seat back when the seat is comfortably occupied by a person weighing about 105 pounds or less will not be sufficient to overcome the preloading and to deflect the seat back.

7. The combination seat back angle adjustor and angular motion vibration isolator of claim 3 wherein said spring member is an elastomer pad.

8. The combination seat back angle adjustor and angular motion vibration isolator of claim 7 wherein said elastomer pad has a durometer in the range of about 35–70 Shore A.

9. The combination seat back angle adjustor and angular motion vibration isolator of claim 8 wherein said elastomer pad has a durometer in the range of about 40 Shore A.

* * * * *